United States Patent [19]
Walker

[11] Patent Number: 5,988,221
[45] Date of Patent: Nov. 23, 1999

[54] DRAIN LINE EXTENDER FOR RECREATIONAL VEHICLES

[76] Inventor: Dewey W. Walker, 1115 Russell St., Golden, Colo. 80401

[21] Appl. No.: 09/027,746

[22] Filed: Feb. 23, 1998

[51] Int. Cl.$^6$ ........................................................ F16K 3/00
[52] U.S. Cl. ............................ 137/899; 137/351; 137/615
[58] Field of Search ................................... 137/615, 899, 137/351

[56] References Cited

U.S. PATENT DOCUMENTS

| | | | |
|---|---|---|---|
| 2,915,081 | 12/1959 | Warren . | |
| 3,496,959 | 2/1970 | Wolfe et al. . | |
| 3,623,500 | 11/1971 | Hoy | 137/615 |
| 4,133,347 | 1/1979 | Mercer | 137/355.16 |
| 4,223,702 | 9/1980 | Cook | 138/106 |
| 4,554,949 | 11/1985 | Sell | 137/899 |
| 4,650,224 | 3/1987 | Smith | 137/899 |
| 4,779,650 | 10/1988 | Sargent et al. | 137/899 |
| 4,844,121 | 7/1989 | Duke | 137/355.16 |
| 4,854,349 | 8/1989 | Foreman | 137/899 |
| 5,023,959 | 6/1991 | Mercer | 137/899 |
| 5,141,017 | 8/1992 | Trottier | 137/355.16 |

*Primary Examiner*—A. Michael Chambers
*Attorney, Agent, or Firm*—Donald W. Margolis; Emery L. Tracy

[57] ABSTRACT

A short drain line extender assembly is provided for use with waste holding tanks on recreational vehicles or the like in conjunction with a removable waste discharge conduit. The extender assembly includes first rigid short, rigid fluid conduit member communicating with a holding tank of a recreational vehicle. A second rigid short, rigid fluid conduit member is telescopically mounted to the first short, rigid fluid conduit member. The second conduit member includes a first movable end secured to the first conduit member and a second distal end adapted for telescoping movement outwardly from the first conduit member. Fluid sealing members are disposed between the first and second short, rigid fluid conduit members. A mechanism is provided for guiding the second short, rigid fluid conduit member longitudinally relative to the first short, rigid fluid conduit member and includes an arrangement for preventing rotational movement between the first and second short, rigid fluid conduit members as the second short, rigid fluid conduit member telescopically moves relative to the first short, rigid fluid conduit member. A device is disposed at the second short, rigid fluid conduit member's distal end for controlling the outflow of short, rigid fluid from the holding tanks through the short, rigid fluid conduit members. Finally, a mechanism is disposed at the distal end of the second short, rigid fluid conduit member for attaching a removable waste discharge conduit.

20 Claims, 3 Drawing Sheets

DRAIN LINE EXTENDER FOR RECREATIONAL VEHICLES

BACKGROUND OF THE INVENTION

1. Field of the Invention

This invention relates generally to sewage discharge devices for recreational vehicles and, more particularly, to devices for extending the discharge device from the recreational vehicle holding tanks to a dump station site via a sewage hose or other conduit. Specifically, the present invention relates to a telescoping drain assembly extender mounted to the recreational vehicle to ease the attachment of a sewage hose or other conduit thereto.

2. Description of the Prior Art

Many types of vehicles, such as recreational vehicles, travel trailers, fifth wheelers, buses, trucks and the like have self-contained washing facilities and/or bathrooms. For ease of style these vehicles will be herein collectively referred to as "recreational vehicles" or "RVs". Such RVs include systems which store sewage/waste water until those materials can be properly disposed of. All of these types of RV,s generally utilize the same means of conducting waste to external storage tanks, dumps, or processing systems, such as those which are used in RV parks, truck/bus stops and the like. Conventional RV vehicles generally have two holding tanks, a sewage tank for receiving fluid sewage from the toilet system, and a gray water tank for receiving waste water, such as from the kitchen, bathroom sinks and shower. These two holding tanks each have a which interconnect to form a single liquid conduit drain line or drain pipe. RVs generally have an easily accessible external cabinet or storage facility which stores a length of flexible sewage discharge hose or other conduit. This discharge hose or other conduit may be manually connected to a fitting on the outlet stub of the drain pipe. The other end of the hose or other conduit is then extended to a dump fitting. Similarly, when the RV is preparing to move on, it is also necessary to handle the hose or other conduit and flush the waste from it before storing it. These processes, i.e., dumping the waste from the holding tank into the inlet receptacle of the RV dump station and disconnecting and storing the hose or other conduit, are the messiest and most dreaded aspects of using an RV. The state-of-the-art system is, at best, somewhat clumsy.

Besides the mess, the predominate problem with the traditional sewage hose or other conduit systems, in that the RV user must get on his or her knees and reach beneath the RV to attach the sewage hose or other conduit to the outlet pipe of the conduit beneath the RV. Consequently, there have been numerous devices which have been developed to increase the ease and/or reduce the clumsiness of attaching and detaching RV sewage hoses or other conduits. U.S. Pat. Nos. 4,133,347; 4,223,702; 4,845,349 and 5,023,959 all disclose systems whereby the flexible discharge hoses are stored in a conduit extension member beneath the RV, and are telescopically moved therefrom when it is desired to secure the hose to a dump site. While these systems have their merits, these devices are stored permanently beneath the RV, and they still generally require the RV user to get on his or her knees to reach beneath the RV to access the sewage hose.

U.S. Pat. Nos. 2,915,081; 3,496,959 and 4,779,650 all disclose telescopic drain pipes that are intended for permanent mounting beneath the RV and for a lengthy extension, i.e. many feet, from the RV directly to the dump site. While this certainly eliminates the need for securing a separate sewage hose or other conduit to the outlet pipe, such long fixed telescopic devices must be stowed beneath the RV. Thus, a user must still reach beneath the RV to access these devices. Moreover, such an excessive length of drain pipes positioned beneath an RV lends itself to potential damage during movement of the RV over the road, from bumps, dips, rocks and the like.

U.S. Pat. Nos. 3,623,500; 4,650,224; 4,844,121 and 5,323,813 all disclose devices which are solid members stored separately within an RV and are for use in conjunction with a flexible RV hose or other conduit. These devices are intended to help support the hose or other conduit in its extension from the RV to the dump site in a variety of manners. Moreover, these devices must be separately stored like the RV sewage hose or other conduit. In addition, the user of such devices must nonetheless get on his or her knees to reach beneath the RV to secure the flexible sewage hose or other conduit.

Finally, U.S. Pat. Nos. 4,554,949 and 5,141,017 disclose devices that are designed to assist in securing and/or cleaning flexible sewage hoses for RVs.

In all of the above described systems for emptying the liquid storage tanks of an RV, an RV user must still generally get on his or her knees and reach beneath an RV in order to access the RV sewage system. This process can be very cumbersome, difficult and uncomfortable at times, particularly if one is attempting to set up an RV in the dark or during inclement weather. It would be much easier to be able to access the conduit outlet from the holding tanks if such outlet were located exterior to the RV. However, this cannot be done inasmuch as such members would project beyond the side of the RV and pose a significant hazard to other vehicles and fixed objects during travel. Thus, there is still a need for a device which will eliminate the need for an RV and user to have to get on his or her knees and reach beneath an RV in order to access and hook up a sewage discharge hose or other conduit.

SUMMARY OF THE INVENTION

Therefore, it is one object of the present invention to provide a short extender assembly for an RV waste holding tank drain line.

It is another object of the present invention to provide a system for a short extender assembly for an RV waste holding tank drain line, which system will eliminate the necessity for an RV user to bend beneath an RV in order to access the sewage discharge system of the RV.

It is still another object of the present invention to provide a device which will enable an RV user to access the sewage discharge system from outside the RV without creating dangerous obstacles or undue piping structure either beneath or extending from the side of the RV.

To achieve the foregoing and other objects and in accordance with the purpose of the present invention, as embodied and broadly described herein, a short drain line extender assembly is provided for use with waste holding tanks on recreational vehicles or the like in conjunction with a removable waste discharge conduit, such as a hose. The extender assembly includes a first short, rigid fluid conduit member communicating with the drain pipe from the holding tanks of a recreational vehicle. A second short, rigid fluid conduit member is telescopically mounted with respect to the first short, rigid fluid conduit member. The second conduit member includes a first proximate movable end secured to the first conduit member and a second distal end adapted for telescoping movement outwardly from the first conduit member. A fluid sealing member is provided between the first and second short short, rigid fluid conduit members. In preferred embodiments, a mechanism is provided for guiding the second short, rigid fluid conduit member longitudinally relative to the first short, rigid fluid conduit member, and also includes a device for preventing rotational movement between the first and second short, rigid fluid conduit members as the second short, rigid fluid conduit member moves telescopically relative to the first short, rigid fluid conduit member. Another device is also disposed at the distal end of the second short, rigid fluid conduit member for controlling the outflow of fluid from the holding tanks of the RV through the conduit member. Finally, a mechanism is disposed at the second short, rigid fluid conduit member distal end for attaching a removable waste sewage discharge hose or other conduit.

As used herein, the term "short" first means short enough to allow the combined first and second short rigid fluid conduits to reside entirely beneath the RV when they are in their collapsed position, and not long enough to reach to a dump station site when they are in their fully extended position. More specifically, and based on the location of the drain line from the holding tanks of most Rvs, the short, rigid conduits need seldom to exceed a maximum of 12 inches nor a minimum of 4 inches. In preferred embodiments, in which a handle is connected to the movable/second short rigid fluid conduit, the length of the short, rigid conduits may be such as to position the handle either substantially flush with the side of the RV, or say up to within about 5 or 6 inches inside of the side of the RV, but at a location which is easily within arm's reach for grasping by an RV user by simply bending over or squatting in a vertical position, but without the need to get on his or her knees, as is required by current state-of-the-art systems. Furthermore, the short drain line extender assembly of the present invention is preferably sized to provide between about a 4 inch to about a 12 inch extension, with not more than about 12 inches of travel for the second conduit as it is extended. Concomitantly, the first and second short, rigid fluid conduits need not be more than about 4 inches to about 12 inches in length. Lengths in excess of 12 inches, if not needed to extend the short drain line extender assembly to the edge of the RV, or slightly beyond, would contribute too much weight and vibration to the assembly when it is in its collapsed position, and too much torque to the system when it is in its fully extended position. Such excessive weight would also provide undue strain at the junctions of piping and possibly develop long term problems. Moreover, less than 4 inches will not provide enough travel to easily position the end of the system at or outside of the side the standard RV when it is in the extended position. While extension lengths of less than 4 inches or more than 12 inches may be used, it appears that about 6 inches of extension is optimum for the standard RV. Moreover, when the short drain line extender assembly of the present invention is designed within the length specifications indicated above, it is easily stored underneath the RV without providing exterior projections or excessive piping beneath the RV, and is readily pulled out to provide easy access for hose hookup.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which.

DETAILED DESCRIPTION OF THE PREFERRED EMBODIMENTS

Figure 5:
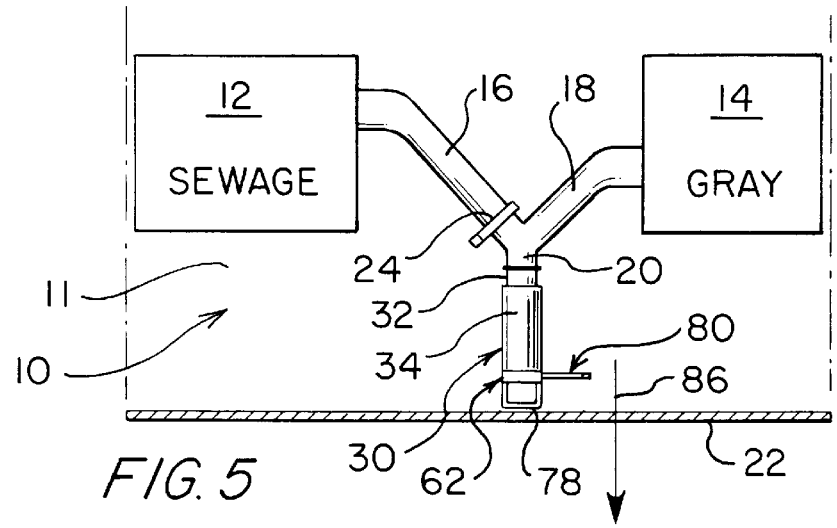
FIG. 5 is a bottom schematic view of a typical sewage system of a recreational vehicle, partially in cross-section, with the short drain line extender assembly of the present invention secured thereto in its closed position.
Figure 6:
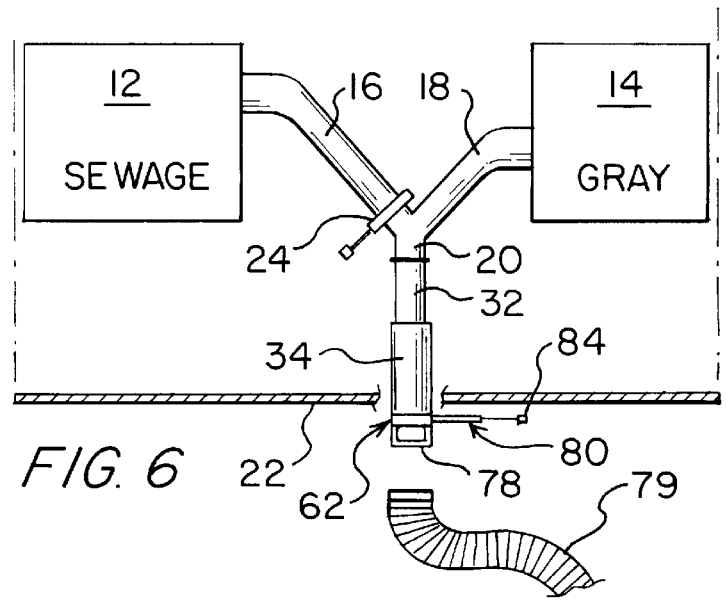
FIG. 6 is a view similar to that of FIG. 5 but illustrating the extender assembly of the present invention in its telescopically extended and open position

Referring first to FIGS. 5 and 6, a partial recreational vehicle, generally 10, having a bottom 11 is shown as including a sewage holding tank 12 for receiving refuse from toilets, not shown, and a gray water holding tank 14 for receiving liquid waste from showers and sinks, also not shown. Each holding tank 12 and 14 has a drain line 16, 18, respectively, that extends therefrom, and these are shown as merging into a single drain pipe or conduit 20.

In the typical prior art designs, the drain pipe 20 extends toward the side 22 of the RV 10. At the end of this fluid drain pipe 20 is usually located a connecting member, typically a bayonet-type connector, which is available for attachment to a separately stowed flexible sewage or waste discharge hose or other conduit. This discharge hose or other conduit would then extend from the drain pipe 20 to a dump hole or site at an RV park or the like, not shown. A fluid control lever is typically found at the end of the drain pipe 20 which would open or close off the drain pipe 20 for fluid flow therethrough from the tanks 12 and 14. As is illustrated in FIGS. 5 and 6, a separate fluid control slide valve 24, which is now a sanitary requirement for all new RVs being built, is located on the drain line 16 from the sewage tank 12.

In lieu of the prior art approach described above, in the present invention, a short extender mechanism 30 is secured to the end of the drain pipe conduit 20. This short extender mechanism 30 may be installed as original equipment during RV manufacturing wherein the short extender mechanism 30 is an integral part of the drain pipe 20, or for existing RVs, may be installed as a retrofit system.

Referring now particularly to FIGS. 1–4, the drain line short extender device 30 of the present invention includes a first short short, rigid fluid conduit member or pipe 32 which is either an integral part of the outlet drain pipe 20 or is secured thereto by any acceptable means known to the art.

Where the first conduit pipe 32 is an integral part of the outlet drain pipe 20, it is typically the same circumference as drain pipe 20, although conduit pipe 32 may be of any circumference which can be effectively joined to drain pipe 20. A second short short, rigid fluid conduit member 34 is mounted to the first short conduit 32 for telescoping movement there along. While the preferred embodiment of the present invention is illustrated wherein the second short conduit or pipe 34 has a diameter larger than the first conduit 32 and is thus adapted to telescopically move in a sliding fashion over the outer surface of the pipe 32, it should be understood that the second conduit 34 may have a outer diameter less than the inner diameter of the pipe 32 and thus be adapted to slide in and out of the interior of the pipe 32.

In the preferred embodiment, the first conduit 32 is a pipe having a three inch inner diameter, and the second conduit 34 has a 4 inch inner diameter which is sized to snugly and slidingly receive the first pipe 32 there within. Conduits 32 and 34 may be constructed of any material, including metal or ceramic, but in its preferred embodiment is constructed of plastic, such as ABS or PVC. In the preferred form shown, a guide mechanism 36 is provided for guiding the longitudinal movement of the second conduit 34 along the first conduit 32 as well as for preventing rotational movement between the two units, 32, 34. In the preferred form shown, the guide mechanism 36 is in the form of a longitudinal rib 38 and is disposed along the outer surface 40 of the first conduit 32. It should be understood that more than one rib guide 38 may be provided along the first conduit 32.

A retention ring 42 is positioned within the inside surface of the second conduit 34 at the first or proximate end 44 thereof. The retainer ring 42 does fit snugly within the end 44 of the conduit 34 and is preferably secured thereto by a plurality of screws or other attachment members 46 which pass through apertures through second conduit 34 and apertures 48 of the ring 42. It should be understood, however, that the ring 42 may be secured to the inside portion of the end 44 in any manner, such as by glue or other known attachment expedients.

The inner surface 50 of the ring 42 includes a notch 52 which forms a channel for receiving the rib 38. As a result, rib 38 may pass longitudinally through notch 52 so as to permit conduit 32 to slidingly move in a guided, non-rotational manner within second conduit 34. Guide mechanism 32 functions as a mechanism for preventing rotation between the conduit components 32 and 34 inasmuch as the notch 52 is sized to snugly receive rib 38. This tongue and groove arrangement prevents relative rotation between the rib 38 with attached conduit 32 and the ring 42 with attached conduit 34. It should be understood, however, that any other type of guide mechanism may be utilized that allows longitudinal movement of the second conduit 34 along the first conduit 32 in such a manner so as to prevent relative rotation therebetween.

A sealing mechanism 54 is provided between the first conduit 32 and the second conduit 34 so as to prevent leakage of fluid which passes through the combined conduit members 32 and 34. In its preferred form, the sealing mechanism 54 is in the form of a ring member 56 which is secured to the exterior surface 40 of the first conduit member 32 at the second or distal end 58 thereof. Thus, the first conduit 32 has a first or proximate end 60 which is adapted for attachment to the drain pipe 20 and a second or distal end 58, while the second conduit 34 likewise has a first or proximate end 44 and a second or distal end 62. Ring 56 is in the form of a bushing which includes a pair of circumferential grooves 64, 66, which are sized and shaped to receive, respectively, a pair of O-rings 68, 70. In its preferred form, the components of ring 56 are secured about the end 58 by solvent bond, glue or other attachment means.

Figure 1:
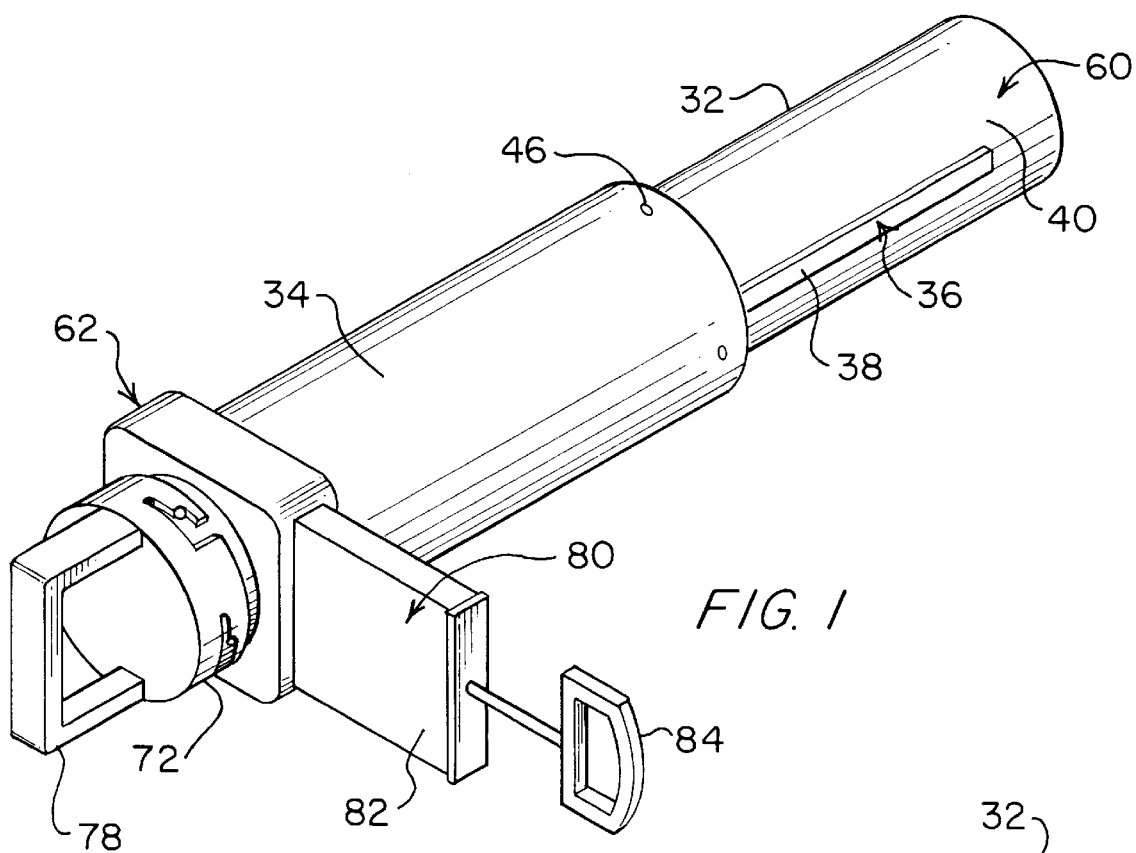
FIG. 1 is an upper front perspective view illustrating the short drain line extender assembly constructed in accordance with the present invention in a telescopically extended position, and with the fluid flow control valve open, and the drain end closed.
Figure 2:
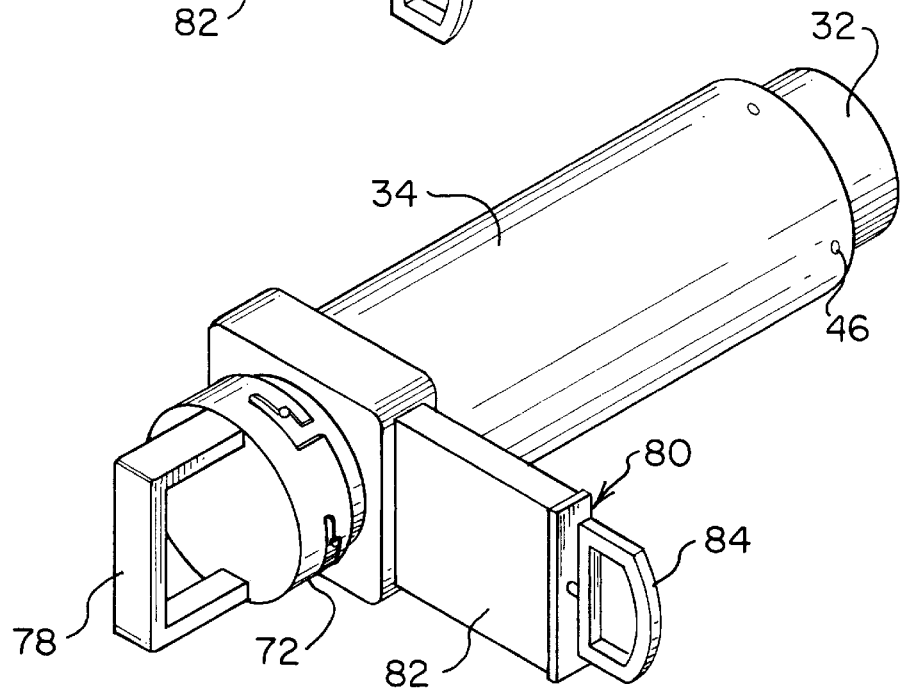
FIG. 2 is an upper front perspective view illustrating the short drain line extender assembly similar to that of FIG. 1, but illustrating the extender assembly in its collapsed position, and with the fluid flow control valve closed, and the drain end also closed.
Figure 3:
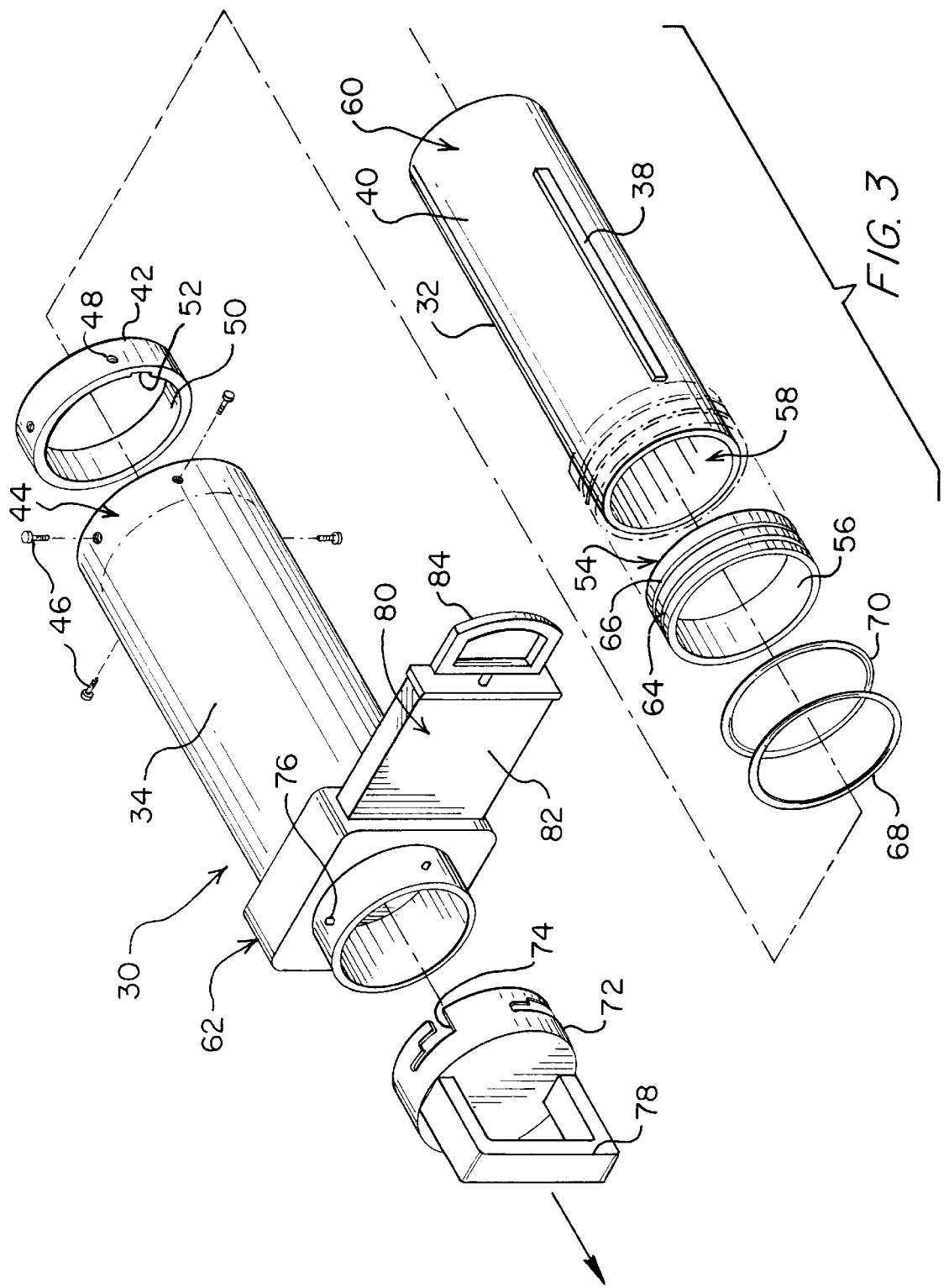
FIG. 3 is an upper front, partially exploded perspective view of the short drain line extender assembly of FIG. 2, but with the drain end open.
Figure 4:
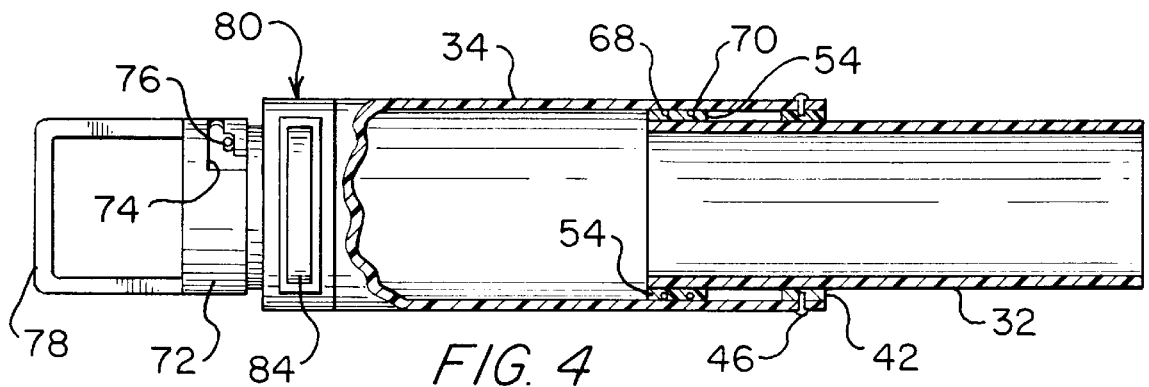
FIG. 4 is a side view, partially in cross-section, of the short drain line extender assembly of the present invention in a partially telescopically extended position.

Ring 56, in addition to serving as a seal between the first conduit 32 and the second conduit 34, also serves as a stop. This is accomplished due to the fact that ring 56 abuts the ring 50 of the second conduit 34, as the second conduit 34 is pulled out to its fully extended position. As a result, this abutment between the ring 54 and the ring 42 defines the maximum extent to which the second short, rigid fluid conduit 34 may be extended relative to the first conduit 32. This can be clearly seen and is illustrated in FIGS. 1, 2, 4, and 6, wherein FIGS. 2 and 5 illustrate the second conduit 34 in its fully collapsed or stored state while FIGS. 1 and 6 illustrate the second conduit 34 in its fully extended state.

The distal end 62 of the second conduit 34 is adapted for connection to a flexible sewage hose 79 or other conduit, as is typical in the art, or a cap 72, which is also typical in the prior art. In preferred fashion, the cap 72 includes a plurality of L-shaped slots 74 which interact with a plurality of pins 76 disposed about the distal end 62, which is known as a bayonet-type coupling. This bayonet-type coupling mechanism is common in recreational vehicles drain systems. Within the present invention, however, the cap 72 includes a handle 78 extending from it. Thus, when the cap 72 with the handle 78 is attached to the distal end 62 of the second conduit 34, the handle 78 serves to enable an RV owner or user to physically pull the second short, rigid fluid conduit 34 so that it extends longitudinally outwardly along the first conduit 32. Also disposed at the distal end 62 of the second conduit 34 is a fluid control valve 80 in the form of a slide control 82 having a handle 84 for opening or closing the same. This type of short, rigid fluid control valve 80 is also well known to the art. When it is desired to open the unit 30 for fluid flow, the handle 84 is pulled laterally away from the slide control member 82 as illustrated in FIG. 1, thereby moving an art known internal slide, not shown, away from the opening of the conduit 34 thereby allowing fluid to flow out of conduit 34. If it is desired to close the valve 80, then the handle 84 is pressed inwardly toward the slide control 82 to thereby move a slide (not illustrated) within the member 80 to close off the opening at the end of the conduit 34.

Thus, the present invention enables an RV user to store the short extender device 30 in its closed position as illustrated in FIG. 5 during travel. When the RV user pulls into an RV park or other dump area and desires to hook up its sewage hose or other conduit to the dump site, the user simply pulls the handle 78 laterally outwardly along the direction 86 so as to extend the second short, rigid fluid conduit member 34 laterally outwardly beyond the side 22 of the RV 10. Once this is accomplished, the handle 78 and cap 72 are rotated so as to disengage the cap 72 from the distal end 62 of the second conduit 34, and a sewage hose 79 or other conduit is then connected to the bayonet-pins 76 in a typical bayonet-type coupling well known in the art. The significant advantage of the present invention is that the distal end 62 of the unit 30 is now positioned outwardly beyond the side 22 of the RV, which provides easy access for sewage hose or other conduit coupling and uncoupling. Thus, the owner or user of the RV 10 does not have to get on his or her knees and bend over under the RV 10 in order to access the end of the drain pipe 20 as in the prior art RV designs. The handle 78 permits the user to simply bend over and easily pull the second conduit 34 away from the first conduit 32 in the direction of the arrow 86 until the unit 30 is in its open position. Once the RV hose or other conduit has been hooked to the distal end 62, the slide handle 84 is opened to allow fluid to flow from the tanks 12 and 14. The sewage control member 24 is optionally left open or closed at the discretion of the RV user. Even if the control valve 24 is left open, the control valve 80 easily controls the fluid outflow from the tanks 12 and 14.

Once an RV owner is ready to move from an RV site, the handle 84 is closed and the hose or other conduit 79 disconnected. At this point, the cap 72 with the handle 78 is twisted back onto the bayonet-pins 76, and the handle 78 is then used to push the second short, rigid fluid conduit 34 longitudinally back onto the first conduit 32 in the direction opposite that of the arrow 86 until the unit 30 is in its fully closed and stored position as illustrated in FIG. 5.

As can be seen from the above, the present invention provides a simple, but unique design to permit an RV owner to use a standard flexible sewage hose or other conduit without having to go through the fuss and mess of having to crawl underneath the recreational vehicle in order to attach the same to the RV's fluid discharge system The present invention may be adapted as original equipment on an RV, or it may be retro-fitted by simply securing the proximate end 60 of the first conduit member 32 onto the drain pipe 20 at a position such that when the device 30 is in its closed and stored position, it is located fully beneath the bottom 11 of the RV 10. The present invention does not add any significant piping underneath the RV, thereby avoiding problems resulting from bottoming out, road debris and the like. Moreover, the present invention does not provide any projections beyond the side 22 during travel of the recreational vehicle 10, which projections would be inherently dangerous. In fact, the handle 78 may be positioned up to within about 5 inches inside of the RV side 22 and still be easily within an arm's reach of an RV user by simply bending over, as opposed to getting on their hands and knees. The device 30 of the present invention is preferably sized and shaped to provide a six inch extension with a minimum of 4 inches and a maximum of 12 inches. More than 12 inches of travel for the second conduit 34 would provide too much weight when the device 30 is in its fully extended position. Such excessive weight would provide undue strain at the junctions of piping and possibly develop long term problems. Moreover, less than 4 inches will not provide enough travel to easily position the distal end 62 well outside the side 22 of the RV 10 in the extended position. However, when the present invention 30 is designed within the specifications indicated above, it is easily stored underneath the RV without providing exterior projections or excessive piping beneath the RV, and is readily pulled out to provide easy access to the distal end 62 for hose or other conduit hookup. Removal of the hose or other conduit allows one to simply return the cap 72 and then use the handle 78 to push the unit back into a stored position, as previously described. Thus, the present invention is easy to use, inexpensive to construct, yet provides significant advantages over prior art designs.

It is therefore seen that the present invention provides a short extender assembly for an RV waste holding tank drain line which system eliminates the necessity for an RV user to bend or kneel beneath an RV in order to access the sewage discharge system of the RV. Furthermore, the assembly enables an RV user to access the sewage discharge system from outside The RV without creating dangerous obstacles or undue piping structure either beneath or extending from the side of the RV.

The foregoing description and the illustrative embodiments of the present invention have been described in detail in varying modifications and alternate embodiments. It should be understood, however, that the foregoing description of the present invention is exemplary only, in that the scope of the present invention is to be limited to the claims as interpreted in view of the prior art. Moreover, the invention and illustratively disclosed herein suitably may be practiced in the absence of any element which is not specifically disclosed herein.

I claim:

1. A short drain line extender assembly for connection with a waste holding tank drain line on a recreational vehicle, which normally requires a removable waste discharge conduit to reach to a dump site, said short drain line extender assembly comprising:

a first short, rigid fluid conduit member for connection with a liquid holding tanks drain line of a recreational vehicle said first short, rigid fluid conduit member having an inner and outer surface and adapted for positioning in a stored position substantially completely beneath a recreational vehicle;

a second short, rigid fluid conduit member having an inner and outer surface, and telescopically connected to said first short, rigid fluid conduit member, said second short, rigid conduit member including a first movable end slidingly secured to said first short, rigid conduit member, and having a second distal end adapted for continuous movement between a first operating position outwardly from said first short, rigid conduit member and a second inward stored position in substantial registration with said first short, rigid conduit member substantially completely beneath a recreational vehicle, wherein said second short, rigid fluid conduit member when moved telescopically relative to said first fluid short, rigid fluid conduit member from said stored position substantially completely beneath a recreational vehicle to said operating position is disposed laterally outwardly up to or slightly beyond the side of such a recreational vehicle, but not normally to a dump site;

fluid sealing means between said first and second short, rigid fluid conduit members; and means disposed at said second short, rigid fluid conduit member distal end for attaching a removable waste discharge conduit in order to normally reach to a dump site.

2. The assembly as claimed in claim 1, wherein said second short, rigid fluid conduit member is sized and shaped to surround said first short, rigid fluid conduit member.

3. The assembly as claimed in claim 1, wherein said first and second short, rigid fluid conduit members are each cylindrical in shape and concentric to one another.

4. The assembly as claimed in claim 1, wherein said fluid sealing means comprises a sealing member disposed circumferentially about the outer end of said first short, rigid fluid conduit member, and which sealing means engages said inner surface of said second short, rigid fluid conduit member.

5. The assembly as claimed in claim 4, wherein said sealing member includes at least one O-ring for fluid sealing between said conduit members.

6. The assembly as claimed in claim 1, wherein said assembly includes means for guiding said second short, rigid fluid conduit member longitudinally relative to said first short, rigid fluid conduit member and including means for preventing rotational movement between said first and second fluid conduit members as said second short, rigid fluid conduit member moves telescopically relative to said first short, rigid fluid conduit member, and wherein further, said guide means comprises at least one projection member disposed along the outer surface of one of said short, rigid fluid conduit members, and at least one channel member disposed on the inner surface of said other short, rigid fluid conduit member, said charnel being adapted for engagement with said projection member.

7. The assembly as claimed in claim 6, wherein said rotational movement prevention means comprises said projection member being in the form of a longitudinal rib, and said channel being in the form of a groove sized and shaped to snugly, but slidingly receive and move along said rib.

8. The assembly as claimed in claim 1, wherein said discharge conduit attachment means comprises a portion of a bayonet-type coupling.

9. The assembly as claimed in claim 1, wherein said assembly further includes a handle member removably attachable to said discharge conduit attachment means, said handle member being adapted for grasping and pulling for actuating the telescopic movement of said second short, rigid fluid conduit member relative to said first short, rigid fluid conduit member out from its stored position beneath a recreational vehicle.

10. In a short, rigid fluid control system for a recreational vehicle including gray water and sewage storage tanks, drain lines exiting from each said storage tank, a short, rigid fluid conduit disposed beneath said recreational vehicle and communicating with said drain lines, a flexible, removable waste discharge conduit for extending from said short, rigid fluid conduit to a dump site, and means for releasably interconnecting said discharge conduit to the distal end of said short, rigid fluid conduit, the improvement wherein said short, rigid fluid conduit comprises a first conduit member disposed beneath the recreational vehicle and having a proximate end connected to said drain lines and a distal end extending toward the side of the recreational vehicle, a second conduit member telescopically mounted to said first conduit member for movement between a closed position beneath the recreational vehicle and an extended position wherein the distal end of said second conduit member projects outwardly from beneath and beyond the side of the recreational vehicle, means for guiding said second conduit member longitudinally relative to said first conduit member including means for preventing rotational movement between said first and second conduit members, and means disposed proximate the distal end of said second conduit member for controlling the outflow of fluid from said tanks through said short, rigid fluid conduit and said removable flexible discharge conduit.

11. The improvement of claim 10, wherein said discharge conduit interconnection means is disposed at the distal end of said second short, rigid fluid conduit member, and wherein said improvement further includes a handle member adapted for releasable attachment to said discharge conduit interconnection means for enabling telescopic movement of said second conduit member relative to said first conduit member.

12. The improvement of claim 10, wherein said second conduit member is sized and shaped to surround said first conduit member, and wherein said improvement further includes sealing means disposed between said first and second conduit members, and wherein said sealing means comprises a sealing ring disposed about the distal end of said first conduit member in communication with the inner surface of said second conduit member.

13. The improvement of claim 12, wherein the proximate end of said second rigid, short fluid conduit member includes an interior sealing ring adapted to abut said sealing means to define the maximum extent of telescopic extension of said second rigid, short fluid conduit member along said first rigid, short fluid conduit member, said interior sealing ring including a groove disposed therein to form a said channel to slidingly receive said projection member.

14. A sewage discharge apparatus for recreational vehicles or the like containing waste holding tanks and utilizing a waste discharge conduit releasably connectable to a fluid waste line communicating with said holding tanks, said apparatus comprising:

a first short, rigid fluid conduit having first and second ends and adapted for fluid connection with said holding tanks;

a second short, rigid fluid conduit having first and second ends and mounted about said first short, rigid fluid conduit for telescopic movement between a closed position wherein the first and second ends of both said short, rigid fluid conduits are aligned proximate each other, and an open extended position wherein the first end of said second short, rigid fluid conduit is proximate the second end of said first short, rigid fluid conduit;

fluid sealing means disposed between said first and second short, rigid fluid conduits;

means for guiding the longitudinal movement of said second short, rigid fluid conduit along said first short, rigid fluid conduit while preventing rotation between said first and second short, rigid fluid conduits;

means disposed proximate said second end of said second short, rigid fluid conduit for controlling the outflow of fluid through said first and second short, rigid fluid conduits; and means disposed at the second end of said second short, rigid fluid conduit for selectively attaching a waste discharge conduit.

15. The apparatus as claimed in claim 14, wherein said guide means comprises at least one elongated rib disposed along the outer surface of said first short, rigid fluid conduit, and an interior ring disposed along the inner surface of second short, rigid fluid conduit proximate the first end thereof, said interior ring including a groove notched therein to receive said rib for sliding movement therethrough while preventing relative rotation between said first and second short, rigid fluid conduits.

16. The apparatus as claimed in claim 15, wherein said sealing means comprises a ring member disposed along the outer surface of said first short, rigid fluid conduit proximate the second end thereof sized to sealingly engage the inner surface of said second short, rigid fluid conduit and to abut the interior ring of said second short, rigid fluid conduit to define the maximum telescopic extension of said second short, rigid fluid conduit relative to said first short, rigid fluid conduit.

17. The apparatus as claimed in claim 16, wherein said sealing ring includes at least two O-rings.

18. The apparatus as claimed in claim 16, wherein said apparatus further includes a handle including means to selectively interact with said conduit attachment means to enable manual operation of the telescopic movement of said second short, rigid fluid conduit relative to said first short, rigid fluid conduit.

19. The apparatus as claimed in claim 16, wherein said second short, rigid fluid conduit telescopically extends between 4 to 12 inches beyond second end of said first short, rigid fluid conduit.

20. A short drain line extender assembly for connection with a waste holding tank drain line on a recreational vehicle in conjunction with a removable waste discharge conduit, said short drain line extender assembly comprising:

a first short, rigid fluid conduit member for connection with a liquid holding tank drain line of a recreational vehicle said first short, rigid fluid conduit member having an inner and outer surface;

a second short, rigid fluid conduit member having an inner and outer surface, and telescopically connected to said first short, rigid fluid conduit member, said second short, rigid conduit member including a first movable end slidingly secured to said first short, rigid conduit member, and having a second distal end adapted for continuous movement between a first position outwardly from said first short, rigid conduit member and a second inward position in substantial registration with said first short, rigid conduit member;

means for guiding said second short, rigid fluid conduit member longitudinally relative to said first short, rigid fluid conduit member and including means for preventing rotational movement between said first and second fluid conduit members as said second short, rigid fluid conduit member moves telescopically relative to said first short, rigid fluid conduit member, and wherein further, said guide means comprises at least one projection member disposed along the outer surface of one of said short, rigid fluid conduit members, and at least one channel member disposed on the inner surface of said other short, rigid fluid conduit member, said channel being adapted for engagement with said projection member;

fluid sealing means between said first and second short, rigid fluid conduit members; and means disposed at said second short, rigid fluid conduit member distal end for attaching a removable waste discharge conduit to provide for the outflow of fluid to a dump site.

\* \* \* \* \*